(12) United States Patent
Yu et al.

(10) Patent No.: US 12,206,795 B2
(45) Date of Patent: Jan. 21, 2025

(54) LIGHTWEIGHT ATTRIBUTE-BASED SIGNCRYPTION (ABSC) METHOD FOR CLOUD-FOG-ASSISTED INTERNET-OF-THINGS (IoT)

(71) Applicant: QILU UNIVERSITY OF TECHNOLOGY, Shandong (CN)

(72) Inventors: JiGuo Yu, Shandong (CN); SuHui Liu, Shandong (CN); AnMing Dong, Shandong (CN); YingLong Wang, Shandong (CN)

(73) Assignee: QILU UNIVERSITY OF TECHNOLOGY, Shandong (CN)

( * ) Notice: Subject to any disclaimer, the term of this patent is extended or adjusted under 35 U.S.C. 154(b) by 362 days.

(21) Appl. No.: 17/912,391

(22) PCT Filed: Mar. 22, 2021

(86) PCT No.: PCT/CN2021/082095
§ 371 (c)(1),
(2) Date: Sep. 16, 2022

(87) PCT Pub. No.: WO2021/190452
PCT Pub. Date: Sep. 30, 2021

(65) Prior Publication Data
US 2023/0131071 A1 Apr. 27, 2023

(30) Foreign Application Priority Data
Mar. 23, 2020 (CN) .......................... 202010205743.8

(51) Int. Cl.
*H04L 29/06* (2006.01)
*H04L 9/06* (2006.01)
(Continued)

(52) U.S. Cl.
CPC .......... *H04L 9/3247* (2013.01); *H04L 9/0618* (2013.01); *H04L 9/0869* (2013.01); *H04L 9/3073* (2013.01)

(58) Field of Classification Search
None
See application file for complete search history.

(56) References Cited

U.S. PATENT DOCUMENTS 10,963,593 B1 * 3/2021 Campagna ............ H04L 9/0861
11,070,378 B1 * 7/2021 Griffin .................. H04L 9/3247
(Continued)

OTHER PUBLICATIONS

Prada-Delgado, M.A. et al. Trustworthy firmware update for Internet-of-Thing Devices using physical unclonable functions. 2017 Global Internet of Things Summit (GIoTS). https://ieeexplore.ieee.org/stamp/stamp.jsp?tp=&arnumber=8016282 (Year: 2017).*
(Continued)

*Primary Examiner* — Jeremiah L Avery
(74) *Attorney, Agent, or Firm* — Kirk A. Wilson; Joseph T. Guy; Patent Filing Specialist Inc.

(57) ABSTRACT

A lightweight attribute-based signcryption (ABSC) method for cloud-fog-assisted Internet-of-things: performing, by a central authority, system initialization to generate a system key pair, and disclosing a public key, the public key including a symmetric encryption algorithm (SEA) and a key derivation function (KDF); generating, by the central authority, a decryption key and an outsourcing decryption key based on a decryption attribute set of a data user, and generating a signature key and an outsourcing signature key based on a signature access structure; calling, by a data owner, a fog node for outsourcing signature, performing symmetric encryption on a plaintext based on a symmetric key, and performing ABSC on the symmetric key based on a defined encryption access structure; and calling, by the data user, a fog node for outsourcing signature verification,
(Continued)

calling a fog node for outsourcing decryption, and performing symmetric decryption on a ciphertext based on an outsourcing decryption result.

9 Claims, 1 Drawing Sheet

(51) Int. Cl.
  *H04L 9/08*   (2006.01)
  *H04L 9/30*   (2006.01)
  *H04L 9/32*   (2006.01)

(56) References Cited

U.S. PATENT DOCUMENTS

| | | | | |
|---|---|---|---|---|
| 11,206,131 B1* | 12/2021 | Griffin | ................ | H04L 9/3247 |
| 11,218,455 B2* | 1/2022 | Ma | ................ | H04L 9/3247 |
| 11,356,427 B1* | 6/2022 | Griffin | ................ | H04L 63/045 |
| 12,132,846 B2* | 10/2024 | Kumar | ................ | H04L 9/3268 |
| 2012/0239930 A1* | 9/2012 | Zaverucha | ........... | H04L 9/3066 |
| | | | | 713/168 |
| 2017/0142081 A1* | 5/2017 | Jutla | ................ | H04L 63/061 |
| 2021/0044972 A1* | 2/2021 | Murray | ................ | G06F 21/602 |
| 2021/0056214 A1* | 2/2021 | Bursell | ................ | H04L 9/0872 |
| 2021/0058379 A1* | 2/2021 | Bursell | ................ | H04L 63/0435 |
| 2021/0157903 A1* | 5/2021 | Bursell | ................ | H04L 9/3239 |
| 2021/0226933 A1* | 7/2021 | Puzeris | ................ | H04L 63/0442 |

OTHER PUBLICATIONS

Zhou, Lu et al. Security and Privacy for the Industrial Internet of Things: An Overview of Approaches to Safeguarding Endpoints. IEEE Signal Processing Magazine, vol. 35, Issue: 5. https://ieeexplore.ieee.org/stamp/stamp.jsp?tp=&arnumber=8454911 (Year: 2018).*

Ulz, Thomas et al. Secured and Easy-to-Use NFC-Based Device Configuration for the Internet of Things. IEEE Journal of Radio Frequency Identification. https://ieeexplore.ieee.org/stamp/stamp.jsp?tp=&arnumber=8019776 (Year: 2017).*

Panagiotou, Paris et al. Design and Implementation of a Privacy Framework for the Internet of Things (IoT). 2018 21st Euromicro Conference on Digital System Design (DSD). https://ieeexplore.ieee.org/stamp/stamp.jsp?tp=&arnumber=8491874 (Year: 2018).*

* cited by examiner

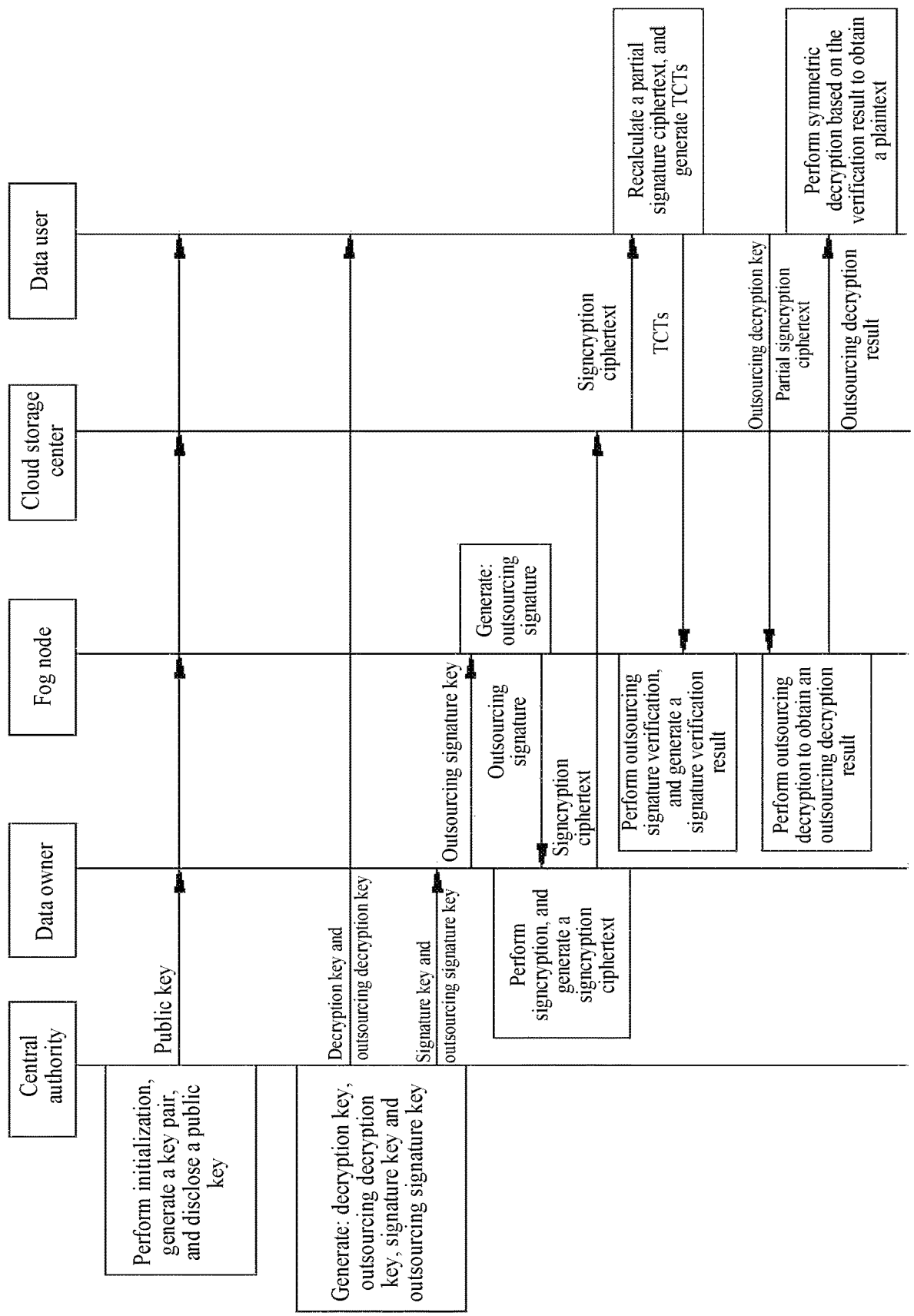

LIGHTWEIGHT ATTRIBUTE-BASED SIGNCRYPTION (ABSC) METHOD FOR CLOUD-FOG-ASSISTED INTERNET-OF-THINGS (IoT)

CROSS REFERENCE TO RELATED APPLICATION

This patent application claims the benefit and priority of Chinese Patent Application No. 202010205743.8, filed on Mar. 23, 2020, the disclosure of which is incorporated by reference herein in its entirety as part of the present application.

TECHNICAL FIELD

The present disclosure relates to the field of attribute-based signcryption (ABSC), and in particular to a lightweight ABSC method for cloud-fog-assisted Internet-of-things (IoT).

BACKGROUND ART

Developed and extended from a conventional Internet, IoT links physical objects in a real world with a cyber world, to provide more efficient and intelligent services for people's lives. The IoT differs from the conventional network in: The IoT encompasses a variety of IoT devices. According to Cisco's Annual Visual Networking Index, machine-to-machine (M2M) connections supporting IoT applications will account for more than half of the world's 28.5 billion connected devices by 2022. On the other hand, there are very limited heterogeneous resources of the IoT devices for storage, computation, etc. Therefore, it is increasingly important to manage data in the IoT.

Cloud-assisted IoT is proposed to resolve a contradiction between massive data of the IoT and limited storage resources of the IoT device, specifically, massive data generated by the IoT are stored to a cloud storage center, and managed uniformly by a resource-rich cloud device. However, outsourced storage is bound to cause a series of security problems, and thus both confidentiality and authenticity of the data are hardly ensured. There are two direct methods to solve these problems, namely sign-then-encrypt, or encrypt-then-sign.

Conventional public key encryption can ensure the confidentiality of the data, but only implements one-to-one sharing, which violates an original intention of IoT design, namely providing the more efficient and intelligent services through data sharing. Presently, attribute-based encryption (ABE) is envisioned as a most promising approach to solve the above problems. It not only ensures the security of the data, but also realizes fine-grained data sharing. Nonetheless, regardless of the sign-then-encrypt or the encrypt-then-sign, the complexity of the scheme is a sum of complexities of two cryptographic primitives. In view of this, how to reduce computational burdens required by signature and encryption is a problem to be solved.

In recent years, in order to ensure the confidentiality and authenticity of the data, and further minimize computational burdens as much as possible, a number of ABSC schemes have been proposed. When the classic ABE scheme is applied to IoT scenarios, many problems arise. In ciphertext-policy attribute-based signature (CPABS), a device can define an access structure independently, which does not comply with an actual situation. Typically, anonymous authentication in most IoT scenarios is controlled by a central authority. Furthermore, according to key-policy ABE (KPABE), a data owner cannot define an access structure independently, which means that an access control right is not directly handed over to the data owner. In addition, the security of the ABE depends on mathematical assumptions of difficulties, which means that decryption burdens are hardly loaded by resource-limited IoT devices.

Therefore, while ensuring the confidentiality and authenticity of the data, how to reduce computational burdens required by signature and decryption to be more applicable to resource-limited IoT devices is a technical problem to be solved.

SUMMARY

In view of the above-mentioned deficiencies, an objective of the present disclosure is to provide a lightweight ABSC method for cloud-fog-assisted IoT, which can reduce computational burdens required by signature and decryption, while ensuring confidentiality and authenticity of data.

The present disclosure provides a lightweight ABSC method for cloud-fog-assisted IoT, including the following steps:

performing, by a central authority, system initialization to generate a system key pair, and disclosing a public key, the public key including a symmetric encryption algorithm (SEA) and a key derivation function (KDF);

assigning, by the central authority, a decryption attribute set to a registered data user, and generating, based on the decryption attribute set, a decryption key and an outsourcing decryption key corresponding to the data user; and assigning, by the central authority, a signature access structure to a data owner, and generating, based on the signature access structure, a signature key and an outsourcing signature key corresponding to the data owner;

selecting, by the data owner, an attribute set satisfying the signature access structure, and calling a fog node based on the outsourcing signature key for outsourcing signature; and performing, by the data owner, symmetric encryption on a plaintext based on a symmetric key, performing ABSC on the symmetric key based on a defined encryption access structure to generate a signcryption ciphertext, and sending the signcryption ciphertext to a cloud storage center; and calling, by a data user having an attribute set satisfying the encryption access structure, a fog node for outsourcing signature verification, and calling a fog node for outsourcing decryption; and performing, by the data user after verifying that a signature is legal according to an outsourcing signature verification result, symmetric decryption on the ciphertext based on an outsourcing decryption result to obtain the plaintext.

In the above implementation, the data user performs the symmetric encryption on plaintext data according to the symmetric key to generate the ciphertext, which improves an arithmetic speed and practicability compared with a scheme in which ABE is directly performed on massive data. By performing the ABSC on the symmetric key based on the defined encryption access structure of the data user, not only are confidentiality and authenticity of the symmetric key ensured, but also one-to-many sharing of the symmetric key is realized. By performing access control on the data user through the encryption access structure, the method allows a data user only having an attribute satisfying the access structure to access encrypted data, and prevents an illegal user from accessing the encrypted data. The cloud storage center stores the ciphertext, and the fog node assists the data owner for signature and decryption, which greatly alleviates a burden of a device.

Preferably, the key pair (PP,MSK) may be expressed as:

$$PP = \left\{ \begin{array}{l} G, G_T, p, e, g, v, Y, \delta_1, \delta_2, u', v', H_1, H_2, H_3, U_e, U_s, KDF, \\ \prod_{SE}(Enc, Dec), \{h_w\}_{attw \in U_e}, \{K_w\}_{attw \in U_d}, \mu_0, \{\mu_i\}_{i \in [l]} \end{array} \right\}$$

$$MSK = \{a\}$$

where, $G$ and $G^T$ each may be a p-order multiplicative group, $g$ may be a generator of the $G$, and $v$ may be an element of the $G$;

$e$ may be a symmetric bilinear mapping function $e: G \times G \to G_T$, and $H_1$, $H_2$ and $H_3$ each may be a collision-resistant hash function, specifically:

$$H_1: G \to Z_p, H_2\{0,1\}^* \to Z_p^*, H_3:\{0,1\}^* \to \{0,1\}^{l_1};$$

$h_w \in Z_p^*$, may be a random value selected from a group $Z^*_p$ for a wth attribute in $U_e$;

$k_w \in Z_p^*$, may be a random value selected from the group $Z^*_p$ for a wth attribute in $U_s$;

$Y = e(g,g)^\alpha$, $\alpha$ being a random value selected from the group $Z^*_p$;

$\Pi_{SE}(Enc,Dec)$ is an initialized SEA, and KDF is an initialized KDF; and $\delta_1, \delta_2, u', v', K_0$, and $u_0$ each are a random value selected from the group $Z^*_p$, and an array $\{u_i\}_{i \in [l]}$ is a set of random values selected from the group $Z^*_p$.

Preferably, the decryption key $SK_d = (SK, SK', \{SK_w\}_{attw \in U_{d,uid}})$ may be expressed as:

$$SK = g^\alpha v^t$$

$$SK' = g^t$$

$$\{SK_w = h_w^t\} attw \in U_{d,uid}$$

where, uid may be a user identity generated after a data user is registered to the central authority;

$U_{d,uid} \in U_e$, may be a decryption attribute set selected by the central authority for the data user; and $t$ may be a random value selected from the group $Z^*_p$;

the outsourcing decryption key $TSK_d$ $(TK'TK', \{TK_w\}_{attw \in U_{d,uid}})$ may be expressed as:

$$T_K = g^{\alpha \cdot t'} v^{t \cdot t'}$$

$$TK' = g^{t \cdot t'}$$

$$\{TK_w = h_w^{t \cdot t'}\}_{attw \in U_{d,uid}}$$

where, $t'$ may be a random value selected by the central authority from the group $Z^*_p$, and the $t'$ may serve as a decryption verification key $VK_d = t'$;

the signature key SKs may be expressed as:

$$D_0 = g^{\alpha_2}(K_0 K_\tau)^{r_\tau}$$

$$D_0' = g^{r_\tau};$$

where, $\alpha_1$ may be a random value selected by the central authority from the group $Z^*_p$, $\alpha_1 < \alpha$, $\alpha_2 = \alpha - \alpha_1$;

$\tau$ may be an additional attribute selected from the attribute set; and $r_\tau$ may be a random number selected from the group $Z^*_p$ for the attribute $\tau$; and the outsourcing signature key $TSK_s = (\{D_i, D'_i, D_{i,w}\}_{i \in [ls]})$ may be expressed as:

$$D_i = g^{\lambda \rho_s(i)}(K_0 K_{\rho_s(i)})^{r_i}$$

$$D_i' = g^{r_i}$$

$$D_{i,w} = K_w^{r_i}, \forall att_w \in U_s / \{att_{\rho_s(i)}\}$$

where, $(M_s, \rho_s)$ may be a signature access structure assigned by the central authority to the data owner, $M_s$, being a matrix $l_s \times k_s$, and $\rho_s$ being a row mapping function;

$(v_2, v_3, \ldots, v_{ks})$ may be a set of random numbers selected by the central authority from the group $Z^*_p$;

$\vec{v} = (\alpha_1, v_2, \ldots, v_{ks})$ may be a random vector constructed based on the random value $\alpha 1$;

$\lambda_{\rho_s(i)} = M_{s,i} \times \vec{v}$; and $r_i$ may be a random value selected from the group $Z^*_p$ for an ith row in the matrix $M_s$ $(M_s, \rho_s)$.

Preferably, the selecting, by the data owner, an attribute set satisfying the signature access structure, and calling a fog node based on the outsourcing signature key for outsourcing signature may include:

selecting, by the data owner, an attribute set satisfying the signature access structure $(M_e, \rho_s)$ for the signature, the attribute set being: $I_s = \{i : \rho_s(i) \in U_{s,sid}\}$;

searching, based on the attribute set, a set of constants $\{w_i\}_{i \in I_s}$ satisfying a following equation:

$$\Sigma_{i \in I_s} w_i M_{s,i} = (1, 0, \ldots, 0) k_s$$

where, $M_{s,i}$ may represent the ith row of the matrix $M_s$, $i$ may represent an attribute mapped by the ith row of the matrix $M_s$ in the attribute set $I_s$, and $w_i$ may represent a corresponding constant;

sending, by the data owner, the set of constants $\{w_i\}_{i \in I_s}$ and the outsourcing decryption key to a fog node, the fog node serving as an outsourcing signature fog node;

selecting, by the outsourcing signature fog node, a random number $\xi$ from the group $Z^*_p$ for the outsourcing signature, thereby obtaining a signature labeled as an outsourcing signature a', the outsourcing signature $\sigma' = (\sigma', \sigma'_2)$ being expressed as:

$$\sigma'_1 = g^\xi \prod_{i \in I_s}(D'_i)^{w_i}$$

$$\sigma'_2 = \left(K_0 \prod_{attw \in U_{s,sid}} K_w\right)^\xi \prod_{i \in I_s}\left(D_i \sum_{\substack{attw \in U_{s,sid} \\ attw \neq \rho_s(i)}}, D_{i,w}\right)^{w_i}$$

and sending, by the outsourcing signature fog node, the outsourcing signature a' to the data owner.

Preferably, the performing, by the data owner, symmetric encryption on a plaintext based on a symmetric key, and performing ABSC on the symmetric key based on a defined encryption access structure to generate a signcryption ciphertext may include:

constructing, by the data owner, the symmetric key based on the KDF, and performing the symmetric encryption on the plaintext based on the symmetric key to generate a ciphertext;

defining, by the data owner, an encryption access structure $(M_e, P_e)$, $M_e$ being a matrix $l_e \times k_e$, and $P_e$ being a row mapping function;

selecting, by the data owner, a random value $s$ from the group $Z^*_p$ to take as a secret exponent, selecting a set of random values $(a_2, a_3, \ldots, a_{ke})$ from the group $Z^*_p$, and constructing a random vector $\alpha = (s, \alpha_2, \alpha_3, \ldots, \alpha_{ke})$;

converting the encryption access structure into a linear secret sharing scheme (LSSS) matrix to obtain an encryption access matrix $M_e$, and calculating $\Phi_{\rho_{e[i]}} = \alpha \times M_{e,i}$ for each row $M_{a,i}$ in the encryption access matrix $M_e$;

selecting, by the data owner, random values $\zeta$ and $q_s$ from the group $Z^*_p$, and performing the signcryption to obtain the signcryption ciphertext, the signcryption ciphertext being expressed as:

$$E_1 = g^s$$

$$E_2 = (\sigma_1^\mu \sigma_2)^s$$

$$\{E_{3,i} = V^{\Phi}_{\rho_e(i)} h^{-s}_{\rho_e(i)}\}_{i \in [l_e]}$$

$$E_4 = Enc(SEK\|d, m)$$

$$\sigma_0 = u'^{H(SEK)} v'^{H(d)}$$

$$\sigma_1 = g^\xi \sigma_1'$$

$$\sigma_2 = D_0 \sigma_2' \left( K_0 \prod_{attw \in U_{s,sid}} K_w \right)^\xi E_2^{R\zeta} \left( \mu_0 \prod_{i \in [l]} \mu_i^{f_i} \right)^s$$

where, $\mu = H_1(E_1)$ $key = Y^s \| \sigma_0 \| tt)$ $R = H_2(E_1\|E_2\|E_3\|E_4\|\sigma_0\|\sigma_1\|M_e\|U_{s,sid})$ $(f_1, \ldots, f_l) \in \{0,1\}^l = H_3(\sigma_1, tt, M_e, U_{s,sid})$ $SEK\|d$ may represent the key; and tt may represent present time in response to the signature, and may be labeled as a signature time identity; and sending, by the data user, the encryption access structure, the signcryption ciphertext and the signature time identity tt to the cloud storage center.

Preferably, the calling, by a data user having an attribute set satisfying an encryption access structure, a fog node for outsourcing signature verification may include:

verifying, by the data user, whether a following equation is satisfied:

$|tt' - tt| \leq \overline{tt}$ where, tt' may represent present time in response to the outsourcing signature verification, and may be labeled as a signature verification time identity, and $\overline{tt}$ may represent a system-default maximum time difference;

verifying, if the equation is satisfied, whether the attribute set of the data user satisfies the encryption access structure;

calculating, by the data user, following parameters if the attribute set of the data user satisfies the encryption access structure:

$\mu = H_1(E_1)$ $R = H_2(E_1\|E_2\|E_3\|E_4\|\sigma_0\|\sigma_1\|M_e\|U_{s,sid})$ $(f_1, \ldots, f_l) \in \{0,1\}^l = H_3(\sigma_1, tt, M_e, U_{s,sid})$;

selecting, by the data user, a random value x from the group $Z^*_p$ to take as a signature verification key $VK_S$, and recalculating a partial signcryption ciphertext to generate $TCT_s = (\sigma_0^x, \sigma_1^x, \sigma_2^x, E_1^x)$;

sending, by the data user, the $\mu$, the R, the $(f_1, \ldots, f_l)$ and the $TCT_s$ to the fog node, the fog node serving as an outsourcing verification fog node; and performing, by the outsourcing verification fog node, the outsourcing signature verification to generate a signature verification result VR, the signature verification result VR being expressed as:

$$VR = \frac{e(g, \sigma_2^x)}{e\left(\sigma_1^s, K_0 \prod_{attw \in U_{s,sid}} K_w\right) e\left((\delta_1^\mu \delta_2)^R, \sigma_0^S\right) e\left(E_1^S, \mu_0 \prod_{i \in [l]} \mu_i^{f_i}\right)}.$$

Preferably, the calling, by a data user having an attribute set satisfying an encryption access structure, a fog node for outsourcing decryption may include:

selecting an attribute set satisfying an encryption access structure $(M_e, \rho_s)$ for the decryption, the attribute set being:

$I_d = \{i : \rho_s(i) \in U_{s,sid}\}$ searching, based on the attribute set, a set of constants $\{c_i\}_{i \in I_s}$ satisfying a following equation:

$\Sigma_{i \in I_d} = c_i M_{e,i} = (1, 0, \ldots, 0) k_e$ where, a subscript i may be in one-to-one correspondence with a row in the matrix $M_e$;

performing, by an outsourcing decryption fog node, the outsourcing decryption to obtain an outsourcing decryption result, a computational equation in the outsourcing decryption being:

$$TCT' = \frac{e(E_1, TK)}{e\left(\prod_{i \in I_d}(E_{3,i})^{c_i}, TK'\right) e\left(E_1, \prod_{i \in I_d}(TK_{\rho_d(i)})^{c_i}\right)} = Y^{st'};$$

and sending, by the outsourcing decryption fog node, the outsourcing decryption result to the data user.

Preferably, the data user may verify a legality of the signature according to a following signature verification equation:

$Y^{VK_d} = VR.$

Preferably, the data user may verify an integrity of the ciphertext according to a following ciphertext verification equation after verifying that the signature is legal according to the signature verification result:

$\sigma_4 = u'^{H(SEK)} v'^{H(d)}$; and $Y^s$ may be restored based on the outsourcing decryption result after the integrity of the ciphertext is verified, the symmetric key may be generated based on the KDF, and the symmetric decryption is performed according to the symmetric key.

The lightweight ABSC method for cloud-fog-assisted IoT provided by the present disclosure achieves the following advantages:

1. By encrypting plaintext data through the SEA, the present disclosure improves the efficiency and practicability of encryption, and is more applicable to massive data.

2. The ABSC method realizes confidentiality and authenticity of the data. By encrypting the symmetric key with CPABE, the present disclosure realizes security and one-to-many sharing of the symmetric key. By performing access control on the data user through the encryption access structure, the present disclosure can allow a data user only having an attribute satisfying the access structure to decrypt and restore the symmetric key, and can prevent an illegal user from accessing encrypted data. On the other hand, the ABSC method uses KPABS that has better practicability and applicability than CPABS and has a constant signature size, thereby reducing a system transmission loss. To sum up, the present disclosure is a practical hybrid-policy ABSC scheme.

3. The data owner outsources ciphertext storage to the cloud storage center, and performs the signature with assistance of a fog node, which greatly alleviates burdens for storage and computation. The data user performs the outsourcing signature verification through the fog node, and outsources most decryption burdens to the fog node, such that the computation overhead of the device is low. Therefore, the present disclosure is applicable to resource-limited devices.

BRIEF DESCRIPTION OF THE DRAWINGS

In order to describe the technical schemes in the embodiments of the present disclosure more clearly, the accompanying drawings required for describing the embodiments are briefly described below. Obviously, the accompanying drawings in the following description show merely some embodiments of the present disclosure, and those of ordinary skill in the art would also be able to derive other accompanying drawings from these accompanying drawings without creative efforts.

The present disclosure is further described with reference to the accompanying drawings.

FIG. 1 is a flowchart of a lightweight ABSC method for cloud-fog-assisted IoT according to an embodiment of the present disclosure.

DETAILED DESCRIPTION OF THE EMBODIMENTS

The present disclosure is further described below in combination with accompanying drawings and specific embodiments so as to enable those skilled in the art to better understand and implement the present disclosure. The illustrated embodiments should not be construed as any limitation to the present disclosure. Embodiments and technical features in the embodiments of the present disclosure may be combined with each other without any conflict.

An embodiment of the present disclosure provides a lightweight ABSC method for cloud-fog-assisted IoT, which can reduce computational burdens required by signature and decryption, while ensuring confidentiality and authenticity of data.

Embodiment

As shown in FIG. 1, the lightweight ABSC method for cloud-fog-assisted IoT includes the following steps:

S100: A central authority performs system initialization to generate a system key pair, and discloses a public key, the public key including an SEA and a KDF.

S200: The central authority assigns a decryption attribute set to a registered data user, and generates, based on the decryption attribute set, a decryption key and an outsourcing decryption key corresponding to the data user; and the central authority assigns a signature access structure to a data owner, and generates, based on the signature access structure, a signature key and an outsourcing signature key corresponding to the data owner.

S300: The data owner selects an attribute set satisfying the signature access structure, and calls a fog node based on the outsourcing signature key for outsourcing signature; and the data owner performs symmetric encryption on a plaintext based on a symmetric key, performs ABSC on the symmetric key based on a defined encryption access structure to generate a signcryption ciphertext, and sends the signcryption ciphertext to a cloud storage center.

S400: A data user having an attribute set satisfying the encryption access structure calls a fog node for outsourcing signature verification, and calls a fog node for outsourcing decryption; and after verifying that a signature is legal according to an outsourcing signature verification result, the data user performs symmetric decryption on the ciphertext based on an outsourcing decryption result to obtain the plaintext.

In Step S100, the key pair is generated as follows:

A security parameter $\lambda$ is input, and two p-order multiplicative groups G and $G_T$ are selected, where g is a generator of the G, and v is an element of the G.

A symmetric bilinear map $e: G \times G \rightarrow G_T$ is selected.

Three collision-resistant hash functions $H_1$, $H_2$ and $H_3$ are selected, specifically, $H_1: G \rightarrow Z_p^*$, $H_2: \{0,1\}^* \rightarrow Z_p^*$, and $H_3: \{0,1\}^* \rightarrow \{0,1\}^l$.

Initialized $U_e$ is a universal set of encryption attributes. Initialized $U_s$ is a universal set of signature attributes. The central authority selects a random value: $h_w \in Z_p^*$ for each attribute in the $U_e$, and a random value $K_w \in Z_p^*$ for each attribute in the $U_s$.

The central authority selects a random value a from a group $Z_p^*$ to calculate $Y = e(g,g)^\alpha$.

The central authority selects random values $\delta_1$, $\delta_2$, u', v', $K_0$, and $u_0$ from the group $Z_p^*$, and selects a set of random values $\{u_i\}_{i \in [l]}$.

A SEA $\Pi_{SC}$(Enc,Dec) is initialized, and a KDF is initialized.

The key pair (PP,MSK) is expressed as:

$$PP = \left\{ \begin{array}{l} G, G_T, p, e, g, v, Y, \delta_1, \delta_2, u', v', H_1, H_2, H_3, U_e, U_s, KDF, \\ \prod_{SE}(Enc, Dec), \{h_w\}_{attw \in U_e}, \{K_w\}_{attw \in U_d}, \mu_0, \{\mu_i\}_{i \in [l]} \end{array} \right\}.$$

$$MSK = \{a\}.$$

In Step S200, the decryption key is generated as follows:

A data user applies for registration to the central authority to obtain a user identity uid.

The central authority selects a decryption attribute set $U_{d,uid} \in U_s$ for the data user.

The central authority selects a random value t from the group $Z_p^*$ to calculate the decryption key, the decryption key $SK_d = (SK, SK', \{SK_w\}_{att_w \in U_{d,uid}})$ being expressed as:

$SK = g^\alpha v^t$ $SK' = g^t$ $\{SK_w = h_w^t\} att_w \in U_{d,uid}$.

The decryption key is generated as follows:

The central authority selects a random value t' from the group $Z_p^*$ to take as a decryption verification key $VK_d = t$, and calculates the outsourcing decryption key, the outsourcing decryption key $TSK_d = (TK, TK', \{TK_w\}_{attw \in U_{d,uid}})$ being expressed as:

$TK = g^{\alpha \cdot t'} v^{t \cdot t'}$ $TK' = g^{t \cdot t'}$ $\{TK_w = h_w^{t \cdot t'}\} attw \in U_{d,uid}$.

The signature key is generated as follows:

The central authority selects a random value $\alpha 1$ from the group $Z^*_p$, $\alpha 1 < \alpha$, and calculates $\alpha 2 = \alpha - \alpha_1$.

The central authority selects an additional attribute T from the attribute set, and selects a random number $r_t$ from the group $Z^*_p$ for the attribute T to calculate the signature key $SK_s$, the signature key $SK_s = (D_0, D_0')$ being expressed as:

$$D_0 = g^{\alpha 2}(K_0 K_\tau)^{r_\tau}$$

$$D_0' = g^{r_\tau}.$$

The outsourcing signature key is generated as follows:

The central authority assigns a special signature access structure $(M_s, \rho_s)$ to the data owner, $M_s$ being a matrix $l_s \times k_s$, and $\rho_s$ being a row mapping function, and converts the signature access structure $(M_s, \rho_s)$ into an LSSS matrix to obtain a signature access matrix $M_s$.

The central authority selects a set of random numbers $(v_2, v_3, \ldots, v_{ks})$ from the group $Z^*_p$, uses the random value $\alpha 1$ to form a random vector $\vec{v} = (\alpha_1, v_2, \ldots, v_{ks})$, and calculates $\lambda\rho s(i) = M_{s,i} \times \hat{v}$.

For each row in the signature access matrix $M_s$, a random value r is selected from the group $Z^*_p$, and the outsourcing signature key is calculated, the outsourcing signature key $TSK_s = (\{D_i, D_i' D_{i,w}\}_{i \in [ls]})$ being expressed as:

$$D_i = g^{\lambda \rho s(i)}(K_0 K_{\rho_s}(i))^{r_i}$$

$$D_i' = g^{r_i}$$

$$D_{i,w} = K_w^{r_i}, \{att_w \in U_s/att_{\rho_s}(i)\}.$$

In Step S300, the fog node assists the data owner for the signature, specifically:

The data owner selects an attribute set satisfying the signature access structure $(M_s, \rho_s)$ for the signature, the attribute set being: $I_s = \{i: \rho_s(s) \in U_{s,sid}\}$.

A set of constants $\{w_i\}_{i \in I_s}$ satisfying a following equation are searched based on the attribute set:

$$\Sigma_{i \in I_s} w_i M_{s,i} = (1, 0, \ldots, 0) k_s$$

where, $M_{s,i}$ represents the ith row of the matrix $M_s$, i represents an attribute mapped by the ith row of the matrix $M_s$ in the attribute set $I_s$, and $w_i$ represents a corresponding constant.

The data owner sends the set of constants $\{w_i\}_{i \in I_s}$ and the outsourcing decryption key to a fog node, the fog node serving as an outsourcing signature fog node.

The outsourcing signature fog node selects a random number $\xi$ from the group $Z^*_p$ for the outsourcing signature, thereby obtaining a signature labeled as an outsourcing signature $\sigma'$, the outsourcing signature $\sigma' = (\sigma'_1, \sigma'_2)$ being expressed as:

$$\sigma'_1 = g^\xi \prod_{i \in I_s}(D_i')^{w_i}$$

$$\sigma'_2 = \left(K_0 \prod_{attw \in U_{s,sid}} K_w\right)^\xi \prod_{i \in I_s}\left(D_i \sum_{\substack{attw \in U_{s,sid} \\ attw \neq \rho_s(i)}}, D_{i,w}\right)^{w_i}.$$

The outsourcing signature fog node sends the outsourcing signature $\sigma'$ to the data owner.

The outsourcing signature is a semi-signature. After the semi-signature is sent to the data owner, the data owner encrypts the plaintext and continues the signature, specifically:

The data owner constructs the symmetric key based on the KDF, and performs the symmetric encryption on the plaintext based on the symmetric key to generate a ciphertext.

The data owner defines an encryption access structure $(M_e, P_e)$, $M_e$ being a matrix $l_e \times k_e$, and $P_e$ being a row mapping function.

The data owner selects a random value s from the group $Z^*_p$ to take as a secret exponent, selects a set of random values $(a_2, a_3, \ldots, a_{ke})$ from the group $Z^*_p$, and constructs a random vector $\alpha = (s, \alpha_2, \alpha_3, \ldots, \alpha_{ke})$.

The encryption access structure is converted into an LSSS matrix to obtain an encryption access matrix $M_e$, and $\Phi_{\rho_{e(i)}} = \alpha \times M_{e,i}$ is calculated for each row $M_{e,i}$ in the encryption access matrix $M_e$.

The data owner selects random values $\zeta$ and $q_k$ from the group $Z^*_p$, and performs the signcryption to obtain the signcryption ciphertext, the signcryption ciphertext being expressed as:

$$E_1 = g^s$$

$$E_2 = (\delta_1^\mu \delta_2)^s$$

$$\{E_{3,i} = v^{\phi \rho_e(i)} h_{\rho_e(i)}^{-s}\}_{i \in [l_e]}$$

$$E_4 = Enc(SEK\|d, m)$$

$$\sigma_0 = g^{s\cdot\zeta}$$

$$\sigma_1 = \sigma_1' \cdot D_0' \cdot g^{q_k}$$

$$\sigma_2 = D_0 \sigma_2'(K_0 K_\tau)^{q_k} E_2^{R\zeta}\left(\mu_0 \prod_{i \in [l]} \mu_i^{f_i}\right)^s$$

$$\sigma_3 = u'^{H(SEK)} v'^{H(d)}$$

where, $\mu = H_1(E_1)$, $E_4 = Enc(SEK\|d, m)$, is the ciphertext generated by performing the symmetric encryption on the plaintext according to the symmetric key, and $SEK\|d$ is the symmetric key constructed by the data owner based on the KDF:

$$KDF(key, 1) = SEK\|d$$

$$key = Y^s\|\sigma_0\|tt,$$

tt representing present time in response to the signature, and being labeled as a signature time identity; and m being plaintext data desired by the data owner for encryption.

$$R = H_2(E_1\|E_2\|E_3\|E_4\|\sigma_0\|\sigma_1\|M_e\|U_{s,sid}),$$

$$(f_1, \ldots, f_l) \in \{0,1\}^l = H_3(\sigma_1, tt, M_e, U_{s,sid});$$

The data user sends the encryption access structure, the signcryption ciphertext and the signature time identity tt to the cloud storage center.

In Step S400, the fog node assists the data user for designcryption. First of all, outsourcing signature verification is performed through the fog node, specifically:

The data user verifies whether a following equation is satisfied:

$$|tt' - tt| < \overline{tt}$$

where, tt' represents present time in response to the outsourcing signature verification, and is labeled as a signature verification time identity, and $\overline{tt}$ represents a system-default maximum time difference.

If the equation is satisfied, whether the attribute set of the data user satisfies the encryption access structure is verified.

The data user calculates following parameters if the attribute set of the data user satisfies the encryption access structure:

$$H=H_1(E_1)$$

$$R=H_2(E_1\|E_2\|E_3\|E_4\|\sigma_0\|\sigma_1\|M_e\|U_{s,sid})$$

$$(f_1,\ldots,f_l)\in\{0,1\}^l=H_3(\sigma_1,tt,M_e,U_{s,sid});$$

The data user selects a random value x from the group $Z^*_p$ to take as a signature verification key $VK_s$, and recalculates a partial signcryption ciphertext to generate $TCT_s=(\sigma_0^x,\sigma_1^x,\sigma_2^x,E_1^x)$.

The data user sends the μ, the R, the $(f_1,\ldots,f_l)$ and the $TCT_s$ to a fog node, the fog node serving as an outsourcing verification fog node.

The outsourcing verification fog node performs the outsourcing signature verification to generate a signature verification result VR, the signature verification result VR being expressed as:

$$VR = \frac{e(g,\sigma_2^x)}{e\left(\sigma_1^s,K_0\prod_{attw\in U_{s,sid}}K_w\right)e\left((\delta_1^{tt}\delta_2)^R,\sigma_0^S\right)e\left(E_1^S,\mu_0\prod_{i\in[l]}\mu_i^{f_i}\right)}$$

Upon a success of the outsourcing signature verification, an outsourcing decryption fog node performs outsourcing decryption, specifically:

An attribute set satisfying the signature access structure $(M_e,\rho_s)$ is selected for decryption, the attribute set being: $I_d=\{i:\rho_s(i)\in U_{s,sid}\}$;

A set of constants $\{c_i\}_{i\in I_s}$ satisfying a following equation are searched based on the attribute set:

$$\Sigma_{i\in I_d}c_iM_{e,i}=(1,0,\ldots,0)k_e$$

where, a subscript i is in one-to-one correspondence with a row in the matrix $M_e$.

The outsourcing decryption fog node performs the outsourcing decryption to obtain an outsourcing decryption result, a computational equation in the outsourcing decryption being:

$$TCT' = \frac{e(E_1,TK)}{e\left(\prod_{i\in I_d}(E_{3,i})^{c_i},TK'\right)e\left(E_1,\prod_{i\in I_d}(TK_{\rho_d(i)})^{c_i}\right)} = Y^{st'}.$$

The outsourcing decryption fog node sends the outsourcing decryption result to the data user.

The outsourcing decryption result obtained from the outsourcing decryption of the fog node is a semi-ciphertext. The fog node sends the semi-ciphertext to the data user for decryption, specifically:

The data user verifies a legality of the signature according to a following signature verification equation:

$$Y^{VK_d}=VR.$$

The data user verifies an integrity of the ciphertext according to a following ciphertext verification equation after verifying that the signature is legal according to the signature verification result:

$$\sigma_4=u'^{H(SEK)}v'^{H(d)}.$$

$Y^s$ is restored based on the outsourcing decryption result after the integrity of the ciphertext is verified, the symmetric key is generated based on the KDF, and the symmetric decryption is performed according to the plaintext.

The aforementioned examples are only preferred embodiments illustrated for fully explaining the present disclosure, and the claimed scope of the present disclosure is not limited thereto. Equivalent substitutions or transformations made by those skilled in the art on the basis of the present disclosure are both within the claimed scope of the present disclosure. The claimed scope of the present disclosure shall be determined by the claims.

What is claimed is:

1. A lightweight attribute-based signcryption (ABSC) method for cloud-fog-assisted Internet-of-things (IoT), comprising the following steps:

performing, by a central authority, system initialization to generate a system key pair, and disclosing a public key, the public key comprising a symmetric encryption algorithm (SEA) and a key derivation function (KDF);

assigning, by the central authority, a decryption attribute set to a successfully registered data user, and generating, based on the decryption attribute set, a decryption key and an outsourcing decryption key corresponding to the data user; and assigning, by the central authority, a signature access structure to a data owner, and generating, based on the signature access structure, a signature key and an outsourcing signature key corresponding to the data owner;

selecting, by the data owner, an attribute set satisfying the signature access structure, and calling a fog node based on the outsourcing signature key for outsourcing signature; and performing, by the data owner, symmetric encryption on a plaintext based on a symmetric key, performing ABSC on the symmetric key based on a defined encryption access structure to generate a signcryption ciphertext, and sending the signcryption ciphertext to a cloud storage center; and calling, by a data user having an attribute set satisfying the encryption access structure, a fog node for outsourcing signature verification, and calling a fog node for outsourcing decryption; and performing, by the data user after verifying that a signature is legal according to an outsourcing signature verification result, symmetric decryption on the ciphertext based on an outsourcing decryption result to obtain the plaintext.

2. The lightweight ABSC method for cloud-fog-assisted IoT according to claim 1, wherein the system key pair (PP,MSK) is expressed as:

$$PP = \left\{\begin{array}{l}G,G_T,p,e,g,v,Y,\delta_1,\delta_2,u',v',H_1,H_2,H_3,U_e,U_s,KDF,\\ \prod_{SE}(Enc,Dec),\{h_w\}_{att_w\in U_e},\{K_w\}_{\in U_s},\mu_0,\{\mu_i\}_{i\in[l]}\end{array}\right\},$$

$$MSK = \{\alpha\}$$

wherein, G and $G_T$ each are a p-order multiplicative group, g is a generator of the G, and v is an element of the G;

e is a symmetric bilinear mapping function e:G×G→$G_T$, and $H_1$, $H_2$ and $H_3$ each are a collision-resistant hash function, specifically:

$$H_1:G\to Z_p^*, H_2\{0,1\}^*\to Z_p^*, H_3:\{0,1\}^*\to\{0,1\}^l;$$

$U_e$ is a universal set of initialized encryption attributes, and $U_s$ is a universal set of initialized signature attributes;

$h_w\in Z_p^*$, is a random value selected from a group $Z^*_p$ for a with attribute in the $U_e$;

$K_w \in Z_p^*$, is a random value selected from the group $Z_p^*$ for a with attribute in the $U_s$;

$Y=e(g,g)^\alpha$, $\alpha$ being a random value selected from the group $Z_p^*$;

$\Pi_{SE}$(Enc,Dec) is an initialized SEA, and KDF is an initialized KDF; and $\delta_1$, $\delta_2$, u', v', $K_0$, and $u_0$ each are a random value selected from the group $Z_p^*$, and an array $\{u_i\}_{i\in[l]}$ is a set of random values selected from the group $Z_p^*$.

3. The lightweight ABSC method for cloud-fog-assisted IoT according to claim 2, wherein the decryption key $SK_d=(SK,SK',\{SK_w\}_{att_w \in U_{d,uid}})$ is expressed as:

$$SK=g^\alpha v^t$$

$$SK'=g^t$$

$$\{SK_w=h_w^{\ r}\}att_w \in U_{d,uid},$$

wherein, uid is a user identity generated after a data user is registered to the central authority; $U_{d,uid} \in U_e$ is a decryption attribute set assigned by the central authority to the data user; and t is a random value selected from the group $Z_p^*$;

the outsourcing decryption key $TSK_d=(TK,TK',\{TK_w\}_{att_w \in U_{d,uid}})$ is expressed as:

$$TK=g^{\alpha \cdot t'}v^{t \cdot t'}$$

$$TK'=g^{t \cdot t'}$$

$$\{TK_w=h_w^{\ t\cdot t'}\}_{att_w \in U_{d,uid}}$$

wherein, t' is a random value selected by the central authority from the group $Z_p^*$, and the t' serves as a decryption verification key $VK_d$=t';

the signature key $SK_s=(D_0,D_0')$ is expressed as:

$$D_0=g^{\alpha_2}(K_0K_f)^{r_\tau}$$

$$D_0'=g^{r_\tau};$$

wherein, $\alpha_1$ is a random value selected by the central authority from the group $Z_p^*$, $\alpha_1<\alpha$, $\alpha_2=\alpha-\alpha_1$;

$\tau$ is an additional attribute selected from the attribute set; and $r_\tau$ is a random number selected from the group $Z_p^*$ for the attribute $\tau$; and the outsourcing signature key $TSK_s=(\{D_i,D_i'D_{i,w}\}_{i\in[l_s]})$ is expressed as:

$$D_i=g^{\lambda \rho_s}\omega(K_0K_{\rho_s}(i))^{r_i}$$

$$D_i'=g^{r_i}$$

$$D_{i,w}=K_w^{r_i}, \forall att_w \in U_s/\{att_{\rho_s}(i)\}$$

wherein, $(M_s,P_s)$ is a signature access structure assigned by the central authority to the data owner, $M_s$ being a matrix $l_s \times k_s$, and $P_s$ being a row mapping function;

$(v_2, v_3, \ldots, v_{ks})$ is a set of random numbers selected by the central authority from the group $Z_p^*$;

$\vec{v}=(\alpha_1,v_2,\ldots,v_{ks})$ is a random vector constructed based on the random value $\alpha_1$, $\lambda_{\rho_s(i)}=M_{s,i} \times \vec{v}$; and $r_i$ is a random value selected from the group $Z_p^*$ for an ith row in the matrix $M_s$ ($M_s,P_s$).

4. The lightweight ABSC method for cloud-fog-assisted IoT according to claim 3, wherein the selecting, by the data owner, an attribute set satisfying the signature access structure, and calling a fog node based on the outsourcing signature key for outsourcing signature comprises:

selecting, by the data owner, an attribute set satisfying the signature access structure $(M_s,P_s)$ for the signature, the attribute set being: $I_s=\{i:\rho_s(i)\in U_{s,sid}\}$;

searching, based on the attribute set, a set of constants $\{w_i\}_{i\in I_s}$ satisfying a following equation:

$$\Sigma_{i\in I_s} w_i M_{s,i}=(1,0,\ldots,0)k_s$$

wherein, $M_{s,i}$ represents the ith row of the matrix $M_s$, i represents an attribute mapped by the ith row of the matrix $M_s$, in the attribute set $I_s$, and $w_i$ represents a corresponding constant;

sending, by the data owner, the set of constants $\{w_i\}_{i\in I_s}$, and the outsourcing decryption key to a fog node, the fog node serving as an outsourcing signature fog node;

selecting, by the outsourcing signature fog node, a random number $\xi$ from the group $Z_p^*$ for the outsourcing signature, thereby obtaining a signature labeled as an outsourcing signature $\sigma'$, the outsourcing signature $\sigma'=(\sigma',\sigma_2')$ being expressed as:

$$\sigma_1' = g^\xi \prod_{i\in I_s}(D_i')^{w_i}$$

$$\sigma_2' = \left(K_0 \prod_{attw \in U_{s,sid}} K_w\right)^\xi \prod_{i\in I_s}\left(D_i \sum_{\substack{attw \in U_{s,sid}\\attw \neq \rho_s(i)}}, D_{i,w}\right)^{w_i};$$

and sending, by the outsourcing signature fog node, the outsourcing signature $\sigma'$ to the data owner.

5. The lightweight ABSC method for cloud-fog-assisted IoT according to claim 4, wherein the performing, by the data owner, symmetric encryption on a plaintext based on a symmetric key, and performing ABSC on the symmetric key based on a defined encryption access structure to generate a signcryption ciphertext comprises:

defining, by the data owner, an encryption access structure $(M_e,P_e)$, $M_e$ being a matrix $l_e \times k_e$, and $P_e$ being a row mapping function;

selecting, by the data owner, a random value s from the group $Z_p^*$ to take as a secret exponent, selecting a set of random values $(a_2, a_3, \ldots, a_{ke})$ from the group $Z_p^*$, and constructing a random vector $\alpha=(s, \alpha_2, \alpha_3, \ldots, \alpha_{ke})$;

converting the encryption access structure into a linear secret sharing scheme (LSSS) matrix to obtain an encryption access matrix $M_e$, and calculating $\Phi_{\rho_{e(i)}}=\alpha \times M_{e,i}$ for each row $M_{e,i}$ in the encryption access matrix $M_e$;

selecting, by the data owner, random values $\zeta$ and $q_k$ from the group $Z_p^*$, and performing the signcryption to obtain the signcryption ciphertext, the signcryption ciphertext being expressed as:

$$E_1 = g^s$$

$$E_2 = (\delta_1^\mu \delta_2)^s$$

$$\{E_{3,i} = v^{\phi \rho_e(i)}h_{\rho_e(i)}^{-s}\}_{i\in[l_e]}$$

$$E_4 = Enc(SEK\|d, m)$$

$$\sigma_0 = g^{s\cdot \zeta}$$

$$\sigma_1 = \sigma_1' \cdot D_0' \cdot g^{q_\kappa}$$

$$\sigma_2 = D_0 \sigma_2'(K_0 K_\tau)^{q_\kappa} E_2^{R\zeta}\left(\mu_0 \prod_{i\in[l']} \mu_i^{f_i}\right)^s$$

$$\sigma_3 = u'^{H(SEK)}v'^{H(d)}$$

wherein, $\mu=H_1(E_1)$, $E_4$ Enc(SEK$\|$d, m), is the ciphertext generated by performing the symmetric encryption on the plaintext according to the symmetric key, and SEK∥d is the symmetric key constructed by the data owner based on the KDF:

$$KDF(key,1)SEK\|d$$

$$key=Y''\|\sigma_0\|tt,$$

tt representing present time in response to the signature, and being labeled as a signature time identity; and m being plaintext data desired by the data owner for encryption, $$R=H_2(E_1\|E_2\|E_3\|E_4\|\sigma_0\|\sigma_1\|M_e\|U_{s,sid}),$$

$$(f_1,\ldots,f_l)\in\{0,1\}^l=H_3(\sigma_1,tt,M_e,U_{s,sid});\text{ and}$$

sending, by the data user, the encryption access structure, the signcryption ciphertext and the signature time identity tt to the cloud storage center.

6. The lightweight ABSC method for cloud-fog-assisted IoT according to claim 5, wherein the calling, by a data user having an attribute set satisfying an encryption access structure, a fog node for outsourcing signature verification comprises:

verifying, by the data user, whether a following equation is satisfied:

$$|tt^*-tt|<\overline{tt}$$

wherein, tt' represents present time in response to the outsourcing signature verification, and is labeled as a signature verification time identity, and $\overline{tt}$ represents a system-default maximum time difference;

verifying, if the equation is satisfied, whether the attribute set of the data user satisfies the encryption access structure;

calculating, by the data user, following parameters if the attribute set of the data user satisfies the encryption access structure:

$$\mu=H_1(E_1)$$

$$R=H_2(E_1\|E_2\|E_3\|E_4\|\sigma_0\|\sigma_1\|M_e\|U_{s,sid})$$

$$(f_1,\ldots,f_l)\in\{0,1\}^l=H_3(\sigma_1,tt,M_e,U_{s,sid}):$$

selecting, by the data user, a random value x from the group $Z^*_p$ to take as a signature verification key $Vk_s$, and recalculating a partial signcryption ciphertext to generate $TCT_s=(\sigma_0^x,\sigma_1^x,\sigma_2^x,E_1^x)$;

sending, by the data user, the μ, the R, the $(f_1,\ldots,f_l)$ and the $TCT_s$ to the fog node, the fog node serving as an outsourcing verification fog node; and performing, by the outsourcing verification fog node, the outsourcing signature verification to generate a signature verification result VR, the signature verification result VR being expressed as:

$$VR=\frac{e(g,\sigma_2^s)}{e\left(\sigma_1^s,K_0\prod_{att_w\in U_{S,sid}}K_w\right)e\left((\delta_1^\mu\delta_2)^R,\sigma_0^S\right)e\left(E_1^S,\mu_0\prod_{i\in[l]}\mu_i^{f_i}\right)}.$$

7. The lightweight ABSC method for cloud-fog-assisted IoT according to claim 6, wherein the calling, by a data user having an attribute set satisfying an encryption access structure, a fog node for outsourcing decryption comprises:

selecting an attribute set satisfying an encryption access structure $(M_e,\rho_s)$ for the decryption, the attribute set being:

$$I_d=\{i:\rho_s(i)\in U_{s,sid}\};$$

searching, based on the attribute set, a set of constants $\{c_i\}_{i\in I_s}$ satisfying a following equation:

$$\Sigma_{i\in I_d}c_iM_{e,i}=(1,0,\ldots,0)k_e$$

wherein, a subscript i is in one-to-one correspondence with a row in the matrix $M_e$;

performing, by an outsourcing decryption fog node, the outsourcing decryption to obtain an outsourcing decryption result, a computational equation in the outsourcing decryption being:

$$TCT'=\frac{e(E_1,TK)}{e\left(\prod_{i\in I_d}(E_{3,i})^{c_i},TK'\right)e\left(E_1,\prod_{i\in I_d}(TK_{\rho_d(i)})^{c_i}\right)}=Y^{st'};$$

and sending, by the outsourcing decryption fog node, the outsourcing decryption result to the data user.

8. The lightweight ABSC method for cloud-fog-assisted IoT according to claim 7, wherein the data user verifies a legality of the signature according to a following signature verification equation:

$$Y^{VK_d}=VR.$$

9. The lightweight ABSC method for cloud-fog-assisted IoT according to claim 8, wherein the data user verifies an integrity of the ciphertext according to a following ciphertext verification equation after verifying that the signature is legal according to the signature verification result:

$$\sigma_4=u'^{H^*(SEK)}v'^{H(d)};\text{ and}$$

$Y^s$ is restored based on the outsourcing decryption result after the integrity of the ciphertext is verified, the symmetric key is generated based on the KDF, and the symmetric decryption is performed according to the symmetric key.

* * * * *